United States Patent [19]

James

[11] Patent Number: 4,664,231
[45] Date of Patent: May 12, 1987

[54] BRAKED CASTORS

[75] Inventor: Michael J. James, Cheltenham, England

[73] Assignee: Global Castors Limited, Cheltenham, England

[21] Appl. No.: 789,333

[22] Filed: Oct. 21, 1985

[30] Foreign Application Priority Data

Oct. 31, 1984 [GB] United Kingdom ................ 8427588

[51] Int. Cl.⁴ ............................................. B62C 7/02
[52] U.S. Cl. .................................. 188/1.12; 16/35 R; 16/47; 188/69
[58] Field of Search ..................... 188/1.12, 31, 60, 69, 188/265, 74, 82.7, 166, 167; 16/35 R, 47

[56] References Cited

U.S. PATENT DOCUMENTS 4,184,227 1/1980 Propst et al. ........................ 16/35 R
4,333,207 6/1982 Atwood ........................ 188/1.12 X

FOREIGN PATENT DOCUMENTS 3130100 2/1983 Fed. Rep. of Germany ..... 16/35 R
530352 7/1955 Italy .................................... 16/35 R
2074024 10/1981 United Kingdom .................... 16/47
2148109 5/1985 United Kingdom .................... 16/47
2151470 7/1985 United Kingdom .............. 16/35 R Primary Examiner—George E. A. Halvosa
Attorney, Agent, or Firm—Collard, Roe & Galgano

[57] ABSTRACT

A twin-wheel castor incorporates brake means comprising an externally-operable brake member which is rockably mounted in a body of the castor for engagement with the wheels of the castor to lock the wheels against rotation. The brake member has a detent projection engageable with a formation of the body to retain the brake member in the braking position, and projecting locking stubs which are engageable between internally projecting webs of the wheels to lock the latter against rotation. The locking stubs are resiliently mounted so that their connection to the main body of the locking member on which the detent projection is mounted will yield, should locking movement of the locking stubs be blocked by engagement with the edge of one of the webs, thus allowing the detent projection to engage the body formation and retain the locking member in the locking position. Thus, as soon as the wheel concerned turns, the resilient mounting of the locking stubs causes the latter to move into a wheel-locking position.

3 Claims, 6 Drawing Figures

BRAKED CASTORS

BACKGROUND OF THE INVENTION

1. Field of the Invention

The invention relates to "braked" castors, and in particular to castors with externally-operable brake means comprising a brake member rockably mounted in a body of the castor for engagement with a castor wheel to lock the wheel against rotation.

2. Description of the Prior Art

It is known for the brake member of such a castor to have a detent projection which engages a recess or other formation in the castor body to retain the member in the braking position, in which position a locking projection of the brake member engages between internal projections of the wheel to prevent rotation of the latter. Such internal projections are commonly spaced radial webs moulded on the inner side of the wheel, and known constructions suffer from the disadvantage that by chance the locking projection may engage the edge of an internal wheel projection and thus be blocked from reaching the locking position. As a result the detent projection does not engage and the wheel is not locked, which may pass unnoticed and hence a potentially dangerous situation can result.

SUMMARY OF THE INVENTION

The object of the invention is to provide a construction of braked castor which overcomes the foregoing disadvantage of known constructions.

According to the invention a castor has a rockably mounted brake member with a detent projection and a locking projection, the latter projection being resiliently mounted so that its connection to the main body of the locking member on which the detent projection is mounted will yield, should the locking projection be blocked by engaging the edge of a wheel projection, to allow the detent projection to engage and retain the locking member in the locking position. As soon as the wheel turns the resilient mounting of the locking projection causes the latter to move into a wheel-locking position relative to the wheel projection concerned.

Preferably the brake member is a unitary plastic moulding, of which both the detent projection and the locking projection are integral parts, moulded from a flexible and resilient material. The flexibility and resilience of this material thus provides the flexible connection of the locking projection as well as the resilient mounting thereof.

In my co-pending application Ser. No. 662,063, filed Nov. 18, 1984, I have disclosed a castor with a locking lever which projects externally of the castor body to provide an operating member for external operation of the lever, and internally of the body for engagement as a locking member between internal wheel projections. The lever has an intermediate mounting portion which takes a pivotal bearing in a recess in the castor body, from which the lever projects both externally and internally, said mounting portion being of hollow and axially-split form so that it is resiliently compressible to allow it to be sprung into position within the bearing recess through an outer side aperture. Such an arrangement is conveniently employed with the present invention, with the detent projection projecting at one side of the axial split and the locking projection projecting at the other side. Thus the split intermediate portion formation performs a dual function, firstly to allow compressibility for insertion of the lever into the recess and secondly to provide the resilient mounting and flexible connection of the locking projection which is the novel feature of the present invention.

As with the castor specifically disclosed in my said co-pending application, a castor in accordance with the invention is preferably a twin-wheel castor with the locking projection having opposed and laterally projecting stubs which engage between radial web-like projections moulded on the inner sides of the two wheels of the castor so that both wheels are simultaneously locked.

Other features of the invention will be apparent from the following description, drawings and claims, the scope of the invention not being limited to the drawings themselves as the drawings are only for the purpose of illustrating a way in which the principles of the invention can be applied. Other embodiments of the invention utilising the same or equivalent principles may be used and structural changes may be made as desired by those skilled in the art without departing from the present invention and the purview of the appended claims.

DESCRIPTION OF THE PREFERRED EMBODIMENT

Figure 1:
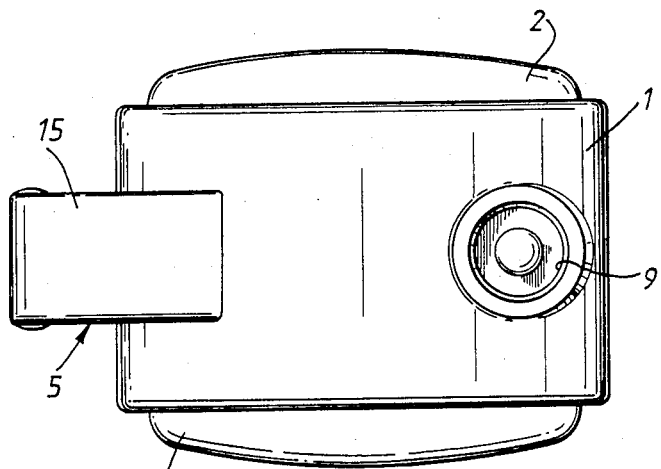
FIG. 1 is a top plan view of a braked castor in accordance with the invention.

The castor assembly illustrated consists of five components—a body 1, two identical wheels 2 and 3, a metal wheel spindle 4 and a locking lever 5. With the exception of the spindle 4 all these components are preferably plastic mouldings. A central portion of the spindle 4 is a tight fit in a through bore 6 in the body 1, and the wheels 2 and 3 are a free running fit on the corresponding projecting ends of the spindle 4. The wheels 2 and 3 are a snap-on fit on the spindle 4, being retained thereon by respective interengaging lip-/groove formations at 7 and 8. The body 1 has an upwardly-open blind mounting bore 9 by which it can be pivotally mounted, in a known conventional manner, on a fixing spindle below an article to be supported by the castor, for example an item of furniture, hospital trolley or the like.

The present invention is concerned with the brake means embodied in the castor which will now be further described with particular reference to the construction and operation of such means. The brake lever 5 is rockable between a wheel-locking position illustrated in FIG. 2, in which the wheels 2 and 3 are not free to turn, and an unlocking position in which the wheels 2 and 3 can turn freely. The lever 5 is shown in detail in FIGS. 5 and 6 and it has an intermediate mounting portion 11 which takes a pivotal bearing in a part-cylindrical bearing recess 12 in the body moulding 1. This recess 12 is disposed towards the rear or trailing end of the body, that is towards the end remote from the mounting spindle bore 9, and it is open at an outer aperture 13 and an inner aperture 14. The lever 5 has an outer end portion 15 which projects from the intermediate portion 11 through the outer aperture 13 to provide an operating member for external operation of the locking means, conveniently being foot operated. An inner end portion 16 of the lever 5 projects from the mounting portion 11 through the inner aperture 14 to provide a locking projection for engagement with the wheels 2 and 3 as will be described.

Figure 2:
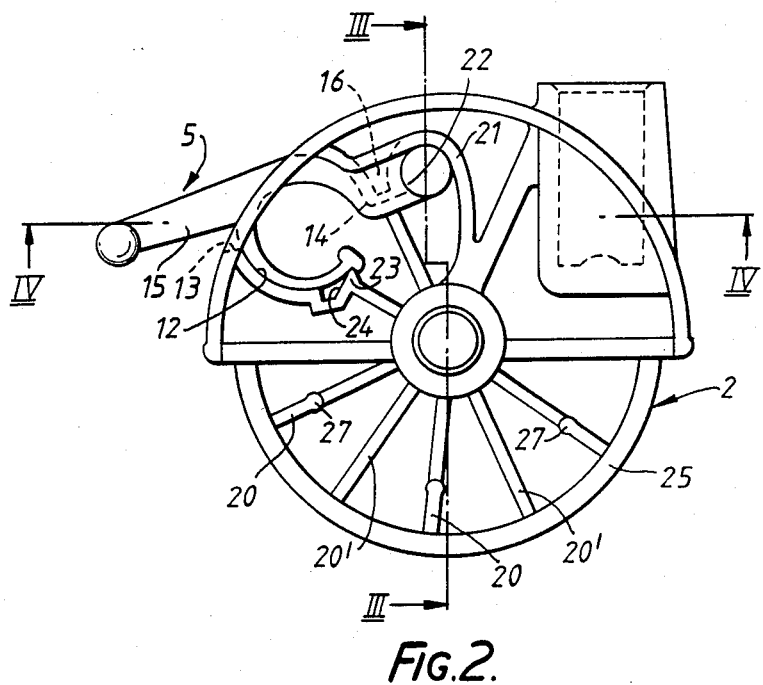
FIG. 2 is a side view thereof with one wheel removed to show the internal construction of the castor.
Figure 3:
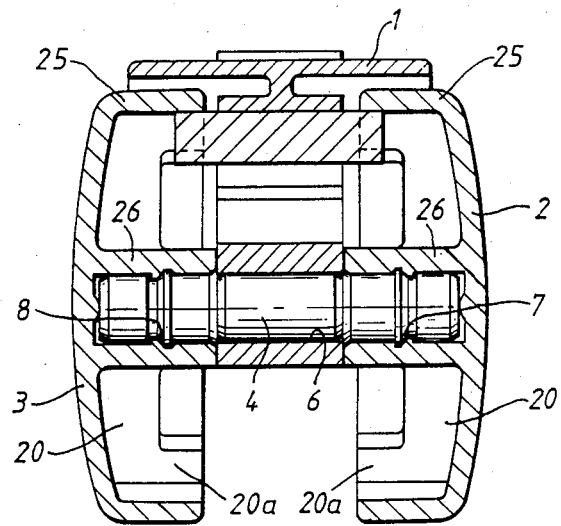
FIG. 3 is a cross-sectional view on the line III—III in FIG. 2.
Figure 4:
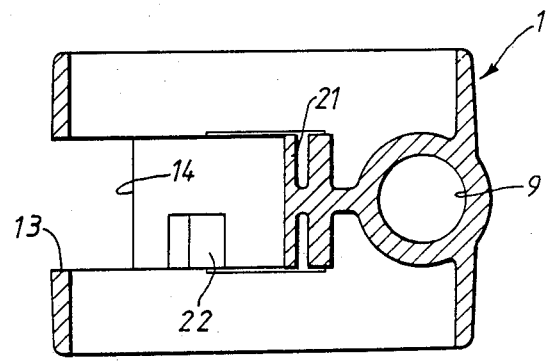
FIG. 4 is a cross-sectional view of a body moulding of the castor on the line IV—IV in FIG. 2.
Figure 5:
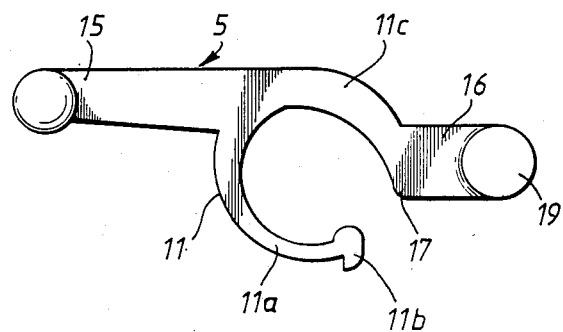
FIGS. 5 and 6 are respectively side and plan detail views of a locking lever of the castor, shown to a larger scale.
Figure 6:
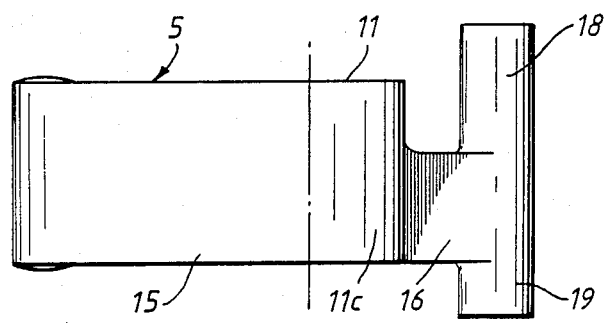

The intermediate portion 11 of the lever 5 is moulded as a hollow part-cylinder with an axial split 17 immediately below the inner portion 16, this split 17 being of adequate width to allow the portion 11 to be compressed at right angles to the pivot axis in the plane of FIGS. 2 and 5 sufficiently for it to be inserted into the bearing recess 12 through the outer aperture 13.

Laterally projecting stubs 18 and 19 at the inner end of the lever 5 engage between adjacent internal webs such as 20 at the periphery of the wheels 2 and 3 in order to lock the wheels 2 and 3 against rotation. As the lever 5 moves between the unlocking and locking positions it slides along an arcuate portion of an internal web 21 within the body 1. At the upper end this portion terminates at a recess 22 in which the stub 18 is closely received to provide support therefor in the locking position. The protuberance 11b also provides a detent projection which engages with a lip 23 at the lower edge of the inner aperture 14, as shown in FIG. 2, to retain the lever 5 in the locking position. On movement of the lever 5 to the unlocking position the section 11a flexes to allow the protuberance to snap over the lip 23 and into a recess 24, which it engages to retain the lever 5 in the unlocking position with the castor wheels 2 and 3 unbraked.

Between the intermediate mounting portion 11 and the stubs 18 and 19 the inner end portion 16 of the lever 5 is of reduced width offset laterally of the centre line of the lever. This permits the stubs 18 and 19, the ends of which project equally at the sides of the lever 5, to be threaded through the apertures 13 and 14 with the lever 5 appropriately angled during fitting of the lever 5 into the body 1. This enables the lever 5 to be the last of the castor components fitted, as the lever can be inserted in this manner from outside the body after the spindle 4 and the wheels 2 and 3 have been fitted.

Each wheel 2 or 3 has equally spaced webs 20 for locking engagement with the stubs 18 and 19, which are interspersed with webs 20' not engageable by these stubs. The webs extend from a peripheral rolling rim 25 of each wheel to a central mounting boss 26 which fits on the spindle 4. Over a radially outer portion 20a each web 20 extends for the full axial width of the wheel 2 or 3, and it is between such portions that the lever stubs 18 and 19 engage in the wheel-locking position. Inwardly of the portions 20a the webs 20 are cut away to provide clearance for the stubs 18 and 19 when in the unlocking position. The webs 20' are inset to clear the stubs 18 and 19 over their full length.

Each radial web portion 20a has an increased thickness and axially extending edge bead 27 of part-circular cross-section. These beads prevent an external turning moment applied to the locked wheels resulting in a reaction force at the stubs 18 and 19 which might move the lever 5 out of the locked position as can happen when the engaged web portions have a plain radial engaged surface as with known braked castors. Thus the castor remains securely braked against external forces tending to move it.

The flexible upper section 11c of the lever portion 11 provides a resilient mounting for the locking projection 16 and a yieldable connection of this projection with the remainder or main body of the lever 5, in accordance with the invention. As clearly seen in FIG. 5, section 11a is of smaller cross-section than section 11c and is therefore relatively more flexible as compared therewith. Should it by chance happen that on movement of the lever 5 to the locking position either of the stubs 18 and 19 should strike one of the web portions 20a "square on", movement of the stubs and the locking projection 16 generally to the locking position would be prevented. With prior constructions the result of this would be that the castor would not be locked, which could well pass unnoticed with foot operation and result in a potentially dangerous situation when the castor is fitted, as an example, to a hospital trolley or hoist. With a castor in accordance with the present invention this hazardous possibility is completely removed.

With movement of the projection 16 blocked by a web portion 20a the section 11c flexes to allow the main body of the lever 5 to move to the locking position. This enables the protuberance or detent projection 11b to snap into retaining position with respect to the lip 23, this retention being secure against the return force exerted by the now-flexed upper section 11c. As soon as the offending wheel 2 or 3 moves, this force immediately acts to move the projection 16, and particularly the two stubs 18 and 19 thereon, to the normal locking position.

Not only does a castor in accordance with the invention ensure positive locking at all times, but it achieves this with negligible complication of the body and lever mouldings and, in particular, without any additional parts being required. Thus a castor results which need only consist of five components in total.

I claim:

1. A twin-wheel castor comprising a body, two wheels respectively rotatably mounted on opposite sides of said body and each formed on an inner side face with an angularly spaced series of internal projections each having an edge, and a one-piece brake member in the form of a locking lever moulded from a resiliently flexible plastic material, said body being moulded with a bearing recess in which said brake member is mounted between said wheels so as to be rockable between an inoperative position and an operative locking position, said brake member projecting externally from said recess for external operation of the brake member, said locking lever having a two-limbed formation within said body with a first main locking limb which projects internally from said recess between said wheels having locking projections for locking engagement with said internal projections of said wheels when the locking lever is in said operative locking position, and a second detent limb having a detent projection engageable with a formation of said body adjacent said bearing recess at the inner side thereof for retention of said locking lever in said operative locking position thereof, said limbs of said brake member having outer side bearing surfaces which engage with said bearing recess to provide a bearing for the brake lever whereby, and due to its inherent resilience, said two-limbed lever formation will yield, should full locking movement of said locking projections be blocked by engagement with an edge of one of said wheel projections, to allow said detent projection to engage said formation of the body and resiliently to urge the locking projections to a wheel-locking position when free to do so as a result of castor movement.

2. A castor according to claim 1, wherein said detent limb is of smaller cross-section than said main locking limb, whereby the detent limb is relatively more flexible as compared with said main locking limb.

3. A castor comprising a body, at least one wheel which is rotatably mounted on said body and which is formed with internal projections, and brake means comprising an externally-operable brake lever moulded from a resilient plastic material and which is rockably mounted in said body for engagement, when in a braking position, with said internal projections to lock the wheel against rotation; said brake lever having a resiliently flexible and integral projecting limb formed with a detent projection engageable with a snap action with a formation of said body to retain the brake lever in said braking position, and an integral locking projection which provides said engagement with said internal projections for locking of the wheel, whereby that portion of said brake member interconnecting said locking projection and said detent projection will yield, should locking movement of the locking projection be blocked by engagement with an edge of one of said wheel projections, to allow the detent projection to engage said formation of the body and urge the brake member to said locking position whereby the resilience of said portion of the brake member will move the locking projection to a wheel-locking position if the wheel commences to turn.

* * * * *